July 9, 1935.  J. J. ROSE  2,007,217
LUBRICANT RUBBING BLOCK FOR ELECTRICAL CIRCUIT INTERRUPTERS
Filed Aug. 24, 1932
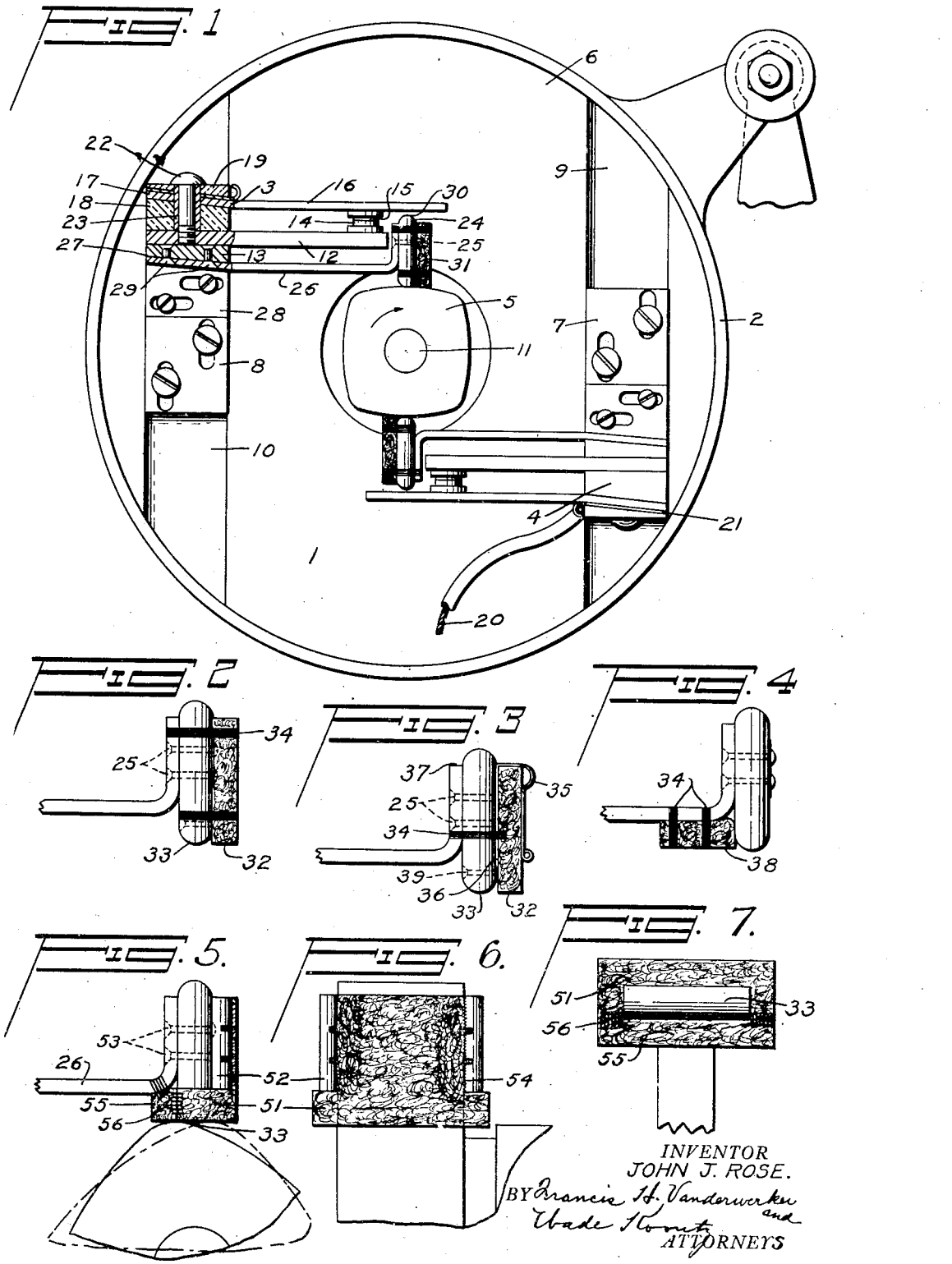
INVENTOR
JOHN J. ROSE.
BY Francis H. Vanderwerken
and Wade Koontz
ATTORNEYS Patented July 9, 1935

2,007,217

UNITED STATES PATENT OFFICE 2,007,217

LUBRICANT RUBBING BLOCK FOR ELECTRICAL CIRCUIT INTERRUPTERS

John J. Rose, Dayton, Ohio

Application August 24, 1932, Serial No. 630,309

25 Claims. (Cl. 184—102)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in devices for lubricating rotary cams or cam surfaces and more specifically has reference particularly to the lubrication of high speed circuit breakers of the type set forth in my joint Patent No. 1,866,492, adapted for regulating the time of sparking or time of ignition in gas engines and similar motors.

The present invention is a continuation in part of my copending application Serial No. 326,056, filed December 14, 1928.

Due to the relatively high speed of the rotary cam of the circuit breaker, lubricating oil or the like applied to the cam is readily thrown off and lost by centrifugal force thereby necessitating frequent attention and in the course of time a film of oil is accumulated on the contact members due to the dispersion, thereby interfering with the proper functioning of the electrical ignition circuit. Further accumulation of oil on the contact members is caused by the follower, for breaking the contacts, bearing against the oiled surface of the rotary cam thereby scraping the oil which eventually is deposited on the contacts.

One object of my invention is to so mount a wick or other lubricant absorbing means on a cam follower that the pressure of the wicking against the cam surface is substantially uniform, thereby avoiding the excessive application of oil to the surface and the consequent splattering thereof.

A further object of my invention resides in surrounding a cam follower with a wick or other lubricant absorbing means in such a manner that the wicking at the forward end of the cam follower will wipe one side of the cam lobe and the wicking at the rearward edge of the cam follower will wipe the other side of the cam lobe with the result that a continuous wiping of the face of the cam is effected by the wicking.

A further object of my invention is to provide a novel arrangement of a cam and a cam follower having lubricant absorbing means carried thereby and so arranged with respect to the cam that a continuous wiping and absorbing action is obtained across the entire face of the cam thereby preventing the throwing off of the lubricant by centrifugal force.

A further object of my invention resides in the novel manner of attaching the lubricant absorbing means to the cam follower so that the inherent absorbent characteristic of the absorbent material is not materially restricted.

A further object of my invention is to mount the lubricating device so that little, if any, wear results on the lubricating device due to the impact of the operating cam.

A further object of my invention is to provide means to prevent the oil scraped off the cam surface by said follower from accumulating on the contacts and to return the oil to the source of supply thereby eliminating frequent oiling.

With these and other objects in view, the invention consists in certain novel features of construction and combinations and arrangements of parts as will be more fully hereinafter described and pointed out in the claims.

Referring to the accompanying drawing:

Fig. 1 is a plan view of an electrical circuit interrupter with the lubricating device of my invention adapted thereto;

Fig. 2 is an enlarged detailed view of the manner of attaching the lubricating device;

Figs. 3 and 4 are detailed views of modifications of the lubricating device;

Fig. 5 is an enlarged detail side view of a further modification of the lubricating device;

Fig. 6 is a front view thereof; and

Fig. 7 is a bottom view of Fig. 6.

Referring to the drawing by reference numerals, and more particularly to Fig. 1:

The electrical circuit interrupter 1 comprises a drum-shaped mounting block 2 rotatably mounted in a suitable housing or support (not shown), a pair of contact assembly units 3 and 4, and a four-lobed cam 5. This mounting block 2 is provided with a back plate 6 that serves as a mount for the contact assemblies 3 and 4 which are attached to angle support members 7 and 8 respectively. The plate 6 is provided with two grooves 9 and 10 within which neatly fit the two angle support members 7 and 8. The plate 6 is also provided with a centrally disposed opening to receive a shaft 11 upon which is mounted the four-lobed cam 5.

Each contact assembly disposed on opposite sides of the cam 5 has its various parts attached fixedly together and the ribbon-like flat springs employed permit the parts of the assembly to be joined together in a pivotless manner. The angle contact supporting member 8 has an arm 12 which extends laterally away from the bottom face 13 of the supporting member 8. Permanently attached at the end of the rigid arm 12 is a contact 14 and mounted in permanent alignment therewith so that their relationship cannot be changed is a second contact 15. The contact 15 is mounted permanently at the center of percussion of a flat leaf spring 16 which is fixed at one end to the member 8. Between arm 12 and the fixed end 17 of the spring 16 is a tapered insulating block 18 and a second insulating strip 19 is placed on the outer side of the spring. An electrical conductor 20 has its end connected to an electrical lug 21 made of conducting material and placed in contact with the end of the spring 16. The lug 21, insulating members 18 and 19 and spring 16 are all permanently and rigidly secured to the arm 12 by means of rivets or screws 22 passing through insulating bushing 23.

The contacts 14 and 15 are separated by means of a timer arm 26 provided with a rubbing block or lifter member 24 which is in continuous engagement with the cam 4 and in intermittent engagement with the free end of the spring 16 for moving the movable contact 15 away from the fixed contact 14 when the high points of the lobes of the rotating cam 2 are in contact with the follower.

The rubbing block 24 is fixed by means of suitable rivets or the like 25 to the end of the timer arm 26 made of a flat leaf spring. The other end of the arm 26 is riveted permanently to the face 27 of an angle block 28 by means of rivets 29. The face of the angle block which contacts with the arm 26 is tapered upwardly and outwardly, thereby disposing the arm 26 at an angle to the horizontal and causing the rubbing block to remain in constant engagement with and rub on the cam 5 as it rotates. In this instance the rubbing block 24 is made of an insulating material, such as fiber, but where insulating material is not necessary, other suitable materials may be used. The rubbing block is of such a length as to provide a space 30 between it and the spring 16, when the rubbing block is in engagement with the low points of the lobes of the cam.

Supported by the arm 26 and fixed adjacent the rubbing block is a lubricating wick 31 made of felt or other suitable absorbent materials, the lower edge 32 of which lies in substantially the same plane as the lower edge 33 of the rubbing block 24, so that there will be a slight contact or pressure between the wick and cam and such impact or varying pressure as may be imparted by the lobes of the cam will be taken up by the rubbing block. In this way a very thin film of oil is applied to the cam. The wick 31 is glued to the follower thereby preventing any relative movement that would otherwise occur between it and the follower when the circuit breaker is operating at comparatively high speeds. In addition to gluing the wick 31 to the follower, it is further secured, as shown in Figs. 1 and 2, to the same by means of a plurality of loops 34 of silk strands or other suitably strong, absorbent material tightly wound around the upper and lower portions of the rubbing block and wick. Such oil as is accumulated on the face of the follower or at the juncture of the flange portion 37 and follower 24 by the scraping action of its edge contacting with the cam 5 is prevented from flowing onto and fouling the contacts 14 and 15 due to the fact that the flowing lubricant is readily absorbed by the silk fibers and transmitted to the wick by capillary action.

In Fig. 3 is shown a modification of the invention in which a substantially U-shaped clip 35 is made of flat spring metal serves to retain the wick 31 in place. This clip 35 is secured to the arm 26 by means of rivets 25 and has one of its legs 36 cooperate with the turned up flange 37 of the arm 26 to clamp the rubbing block 24 thereto. The silk loops 34 are passed through the wicking and wound tightly around the rubbing block 24 and turned up flange 37.

In the modification shown in Fig. 4 the lubricating wick 38 is positioned adjacent the bottom and rear faces of the arm 26 and rubbing block 24 respectively and is secured to the rubbing block and arm in the manner above described. The silk strands 34 are spaced sufficiently away from the rubbing block to prevent the breaking of strands by wear that would otherwise occur if the strands were positioned closer to the follower and in contact with the cam.

The rubbing blocks 24 in Figs. 1, 2 and 3 are each provided with one or more openings 39 to permit any accumulated oil on the rear face of the block 24 to flow through the openings and be absorbed by the wicking.

The metal clips 35 shown in Fig. 3, may be eliminated if desired, since the wick is securely fixed to the rubbing block by the use of glue as above described.

A still further modification of my invention is illustrated in Figs. 5, 6 and 7, in which the lubricating wick 51 completely surrounds the cam follower 33. This is accomplished by mounting a piece of wicking forward of the cam follower 33 by means of a sheet metal clip 52 fixed to the cam follower 33 by means of rivets 53. The clip 52 may be provided at its side edges with serrated teeth 54, which are adapted to engage the wicking 51 in the manner illustrated in Fig. 6 to substantially prevent any relative movement that would otherwise occur between the wick and cam follower when the circuit interrupter is operating at high speeds. By gripping the side edges of the wicking material, as shown in Figs. 6 and 7, an unrestricted zone of absorption is provided between the gripping edges of the clip 52.

As will be noted by referring to Fig. 7, the portion of the wick 51 immediately below the clip 52 is sufficiently long to allow the edges to be turned over the sides of the cam follower and sewed or otherwise secured to the second piece of wicking 55 mounted on the rear face of the cam follower 33. It will be observed that the stitching 56 for securing the wick 55 to the overhanging ends of the wick 51 are tightly drawn over the timer arm 26 adjacent its flanged portion 37 in order to securely hold the wick in proper position. It should be noted that the wicking material is so disposed with respect to the rubbing edge of the cam follower that the varying pressure loads of the cam lobes, due to the high speed at which the cam rotates, are taken directly by the rubbing edge of the cam follower rather than by the wicking material. As a result, therefore, of this arrangement the lubricant in the wicking material is prevented from being squeezed out as would otherwise be the case were the pressure loads taken by the wicking material. While the wicking for lubricating the cam is herein shown in two pieces, it is to be readily understood that the same can be made in a single piece having an opening for receiving the contacting end of the follower 33. By means of this construction a continuous lubricating and wiping action of the cam surface will be obtained.

While I have shown my invention as applied to an electrical circuit interrupter, it is not intended to limit myself to this type of device nor do I intend to limit my invention to a liquid lubricant since other types of lubricants may be used. Various devices are provided with high speed movable cams that require lubrication which may be effected by the application of my invention by making various slight changes in the general form and arrangement of parts described without departing from the spirit of my invention.

Having thus described my invention, what I claim as new and desire to secure by Letters Patent is:

1. In combination, a rotatably movable member provided with a cam surface and lubricating means for lubricating said surface, comprising a follower in uninterrupted contact with the cam surface during the rotation of the cam, lubricant absorbing material attached to and rearward of said follower with respect to the directional rotation of said member and means, for returning the accumulated lubricant on the forward portion of said follower to the said lubricant absorbent material.

2. In combination, a rotatably movable member provided with a cam surface and lubricating means for lubricating said surface, comprising a follower, lubricating material attached to and rearward of said follower with respect to the directional rotation of said member, and lubricant absorbing means secured about said lubricating material and follower for effecting a return flow of accumulated lubricant on the forward face of said follower to said lubricating material.

3. In a circuit breaker, means for effecting a periodic separation of two separable contact members comprising, a cam and follower means operable independent of said contact members, said follower means having continuous engagement with said cam during the rotation of said cam, and lubricant absorbing material carried by said follower, and so arranged with respect thereto as to effect a substantially uninterrupted oiling action of said cam.

4. In a circuit breaker, means for effecting a periodic separation of two separable contact members, comprising a cam, a follower and a cantilever spring operable independent of said contact members for supporting said follower and for effecting continuous engagement thereof with said cam during the rotation of said cam, and lubricant absorbing material carried by said follower adjacent its rubbing surface for effecting a substantially continuous lubricating and wiping action of said cam.

5. In a circuit breaker means for effecting a periodic separation of two separable contact members, comprising a cam, a follower operable independent of said contact members and spring means for maintaining said follower in continuous engagement with said cam throughout its entire cycle, and lubricating material movable with said follower and cooperating therewith for effecting a substantially continuous oiling and wiping action of said cam.

6. In an electrical circuit breaker mechanism of the class described, comprising a rotatably movable member provided with a cam surface, a follower in continuous engagement with said surface, lubricating material attached to the forward and rearward walls of said follower for effecting a substantially continuous lubricating and wiping action of said cam surface.

7. In an electrical circuit breaker mechanism of the class described, a rotatably movable member provided with a cam surface, a follower in continuous engagement with said surface, absorbent material attached to said follower forward thereof for lubricating said cam surface, and further absorbent material positioned rearward of said cam follower and secured to said first-mentioned absorbent material for effecting with said first-mentioned material a substantially continuous lubricating and wiping action of said cam surface.

8. In an electrical circuit breaker mechanism of the class described, comprising a rotatably movable member provided with a cam surface, a follower in continuous engagement with said surface, and absorbent material carried by and completely surrounding said cam follower adjacent the contacting surface thereof for effecting a substantially continuous lubricating and wiping action of said cam surface, the side portions of said absorbent material being at least equal in width to the width of the cam surface and contacting therewith to absorb accumulated lubricant along the edges of said cam surface.

9. In an electrical circuit breaker mechanism of the class described, comprising a rotatably movable member provided with a cam surface, a follower in continuous engagement with said cam surface, and absorbent material carried by and completely surrounding said cam follower adjacent the contacting surface thereof for effecting a substantially continuous lubricating and wiping action of said cam surface, the side portions of said absorbent material being greater in width than the width of said cam surface to prevent the accumulation of lubricant along the edges of said cam surface.

10. In an electrical circuit breaker mechanism of the class described, a rotatably movable member provided with a cam surface, a follower member in continuous contact with said cam surface and lubricating means for lubricating said cam surface comprising wicking material secured to said follower member and completely surrounding the contacting edge thereof, the contacting surface of said wicking material being so arranged with respect to the contacting edge of said cam follower such that the pressure loads of the cam lobes are substantially entirely taken by said cam follower.

11. In an electrical circuit breaker mechanism of the class described, a rotatably movable member provided with a cam surface, a follower in continuous engagement with said cam surface, a clip on said follower and wicking material mounted in the clip for substantially continuously lubricating said cam surface, said wicking material being fixedly mounted in said clip in such a manner as to provide for unrestricted lubricant absorption substantially throughout its entire area.

12. In an electrical circuit breaker mechanism of the class described, a rotatably movable member provided with a cam surface, a follower in continuous engagement with said cam surface, a metallic clip fixedly secured to said cam follower and wicking material securely mounted in said clip, said clip being provided with gripping side edges adapted for gripping the side edges of said wicking materal so as to provide an unrestricted zone of lubricant absorption intermediate its gripped edges.

13. In combination with a rotatable cam of lubricating means for lubricating said cam comprising, a cam follower of relatively non-compressible material, lubricant absorbing material secured to said follower and arranged with respect thereto to be substantially free from direct pressure loads of said cam surface but to effect a feeding of oil to and wiping of oil therefrom and spring means of sufficient strength to maintain said follower in continuous engagement with said cam during the rotation of said cam.

14. Lubricating means adapted for lubricating a cam comprising, a flexible member supported at one end, a follower of relatively non-compressible material carried by said flexible member at its other end, said flexible member being of sufficient strength to maintain said follower in uninterrupted engagement with said cam during the rotation of said cam, and lubricant absorbing material secured to said follower and cooperating therewith for feeding oil to and absorbing oil from the rubbing surfaces of said cam and follower.

15. Lubricating means adapted for lubricating a cam having a plurality of lobes comprising, a leaf spring rigidly fixed at one end, a follower member of relatively non-compressible, wear resisting material carried by said leaf spring, said spring being of sufficient strength to maintain said follower in uninterrupted engagement with said cam member during the rotation of said cam member, a lubricant absorbing material secured to said follower, said lubricant material being so arranged with respect to said follower as to be substantially free from direct pressure loads imparted to said follower by said cam capable of effecting therewith a substantially continuous feeding and absorbing of lubricant to and from said cam surface.

16. In combination with a rotatable cam of lubricating means comprising, a follower member of relatively non-compressible, wear resisting material, lubricant absorbing material, a metallic clip for securing said lubricant absorbing material to said follower, a spring means of sufficient strength to maintain said follower in uninterrupted engagement with said cam during the rotation of said cam, said lubricant absorbing material being so arranged with respect to said follower and said cam to effect a substantially continuous feeding and absorbing of lubricant to and from said cam surface.

17. In combination, a rotatably movable member provided with a cam surface, a lubricating means for lubricating said surface comprising, a cam follower in uninterrupted engagement with said cam during the rotation of said cam, a lubricant absorbing material attached to said follower and in engagement with the side thereof that is presented toward the direction of rotation of said cam, said lubricating material being substantially free from direct pressure loads of said cam.

18. A cam follower comprising a cam-rubbing block, lubricant-containing absorbent material secured to the block on one side thereof for contact with a cam surface to lubricate the same and absorbent material secured to the block on the opposite side for absorbing the excess lubricant scraped off the cam surface by the rubbing action of the block.

19. As an article of manufacture, a spring leaf, a rubbing block for a cam attached at one end of said spring leaf, the other end being attachable to a support to provide a cantilever spring action, said spring leaf being of sufficient strength to maintain said rubbing block in uninterrupted contact with said cam during the rotation of said cam, and lubricant absorbing material disposed in contact with the sides and opposite faces of the block for absorbing oil accumulating on said block and thus prevent same from being thrown off, said lubricant absorbing material being fixedly secured to the said block and also to the said spring leaf.

20. In combination, a rotatable cam, a cam follower, spring means for supporting said follower and of sufficient strength to maintain said follower in continuous engagement with the rubbing surface of said cam during the rotation of said cam, and an absorbent lubricant containing material fixed to the follower and being co-extensive with the cam-engaging edge of the follower to contact with the cam for feeding oil to and absorbing oil from the rubbing surface of the cam.

21. In combination, a rotatable cam, a follower having uninterrupted engagement with said cam, spring means for supporting said follower and of sufficient strength to maintain the engagement of the rubbing surfaces of said cam and follower during the rotation of the cam, and absorbent lubricant containing material movable with said follower and disposed against a face of the follower with a portion of said material adjacent a cam-engaging edge of the rubbing surface of the follower for contact with the cam to feed lubricant to and absorb lubricant from the rubbing surface thereof, said absorbent material having its cam contacting portion disposed in substantially the same plane as the cam-rubbing surface so that varying pressure loads of the cam are taken directly by the rubbing surface of the cam follower rather than by the absorbent material.

22. In combination, a rotatable cam, a cam follower of relatively non-compressible wear resisting material, a cantilever spring member fixed to the cam follower and supporting same in continuous rubbing contact with the cam during the rotation of the cam, compressible lubricant-containing absorbent material secured to said spring member for swabbing contact with the rubbing surface of the cam, the cam-contacting surfaces of the follower and absorbent material being contiguous and in substantially the same plane so that the varying pressure loads of the cam are borne by the cam follower with only a slight and constant pressure or contact between the cam and absorbent material sufficient to produce an uninterrupted thin film of lubricant on the rubbing surface of the cam.

23. As an article of manufacture, a flat metallic spring, a cam follower of relatively non-compressible wear-resisting material secured to one end of the spring, a lubricant-containing pad of absorbent material disposed against one face of the follower and being co-extensive with the cam-rubbing surface of the follower for swabbing contact with the rubbing surface of the cam to lubricate the same, and means holding the follower and absorbent material in intimate contact so that lubricant accumulating on the follower and flowing to said absorbent material may be absorbed thereby, said holding means being remotely positioned from the contacting surfaces of the cam and follower and being engaged with the said absorbent material only at opposite side edges of the latter to provide an unrestricted zone of absorption therebetween.

24. In combination, a rotatable cam, a support, a contact-carrying arm fixed at one end only to said support, a cam-rubbing block, a spring arm carrying said block and fixed to said support for holding said block in uninterrupted contact with the cam during the rotation of the latter, a lubricant-containing absorbent material disposed on the underside of the block-carrying spring arm and in abutment with one face of the block in position for swabbing the rubbing surface of the cam, and means fastening the material to the said spring arm.

25. A cam follower comprising a cam-rubbing block having lubricant-containing absorbent material on one side thereof for swabbing the cam surface rubbed by the block and provided with one or more oil ducts leading to the absorbent material from the opposite side of the block to permit any accumulated lubricant on such opposite side to flow to and be absorbed by said absorbent material.

JOHN J. ROSE.